United States Patent [19]

Okumura et al.

[11] Patent Number: 4,682,327

[45] Date of Patent: Jul. 21, 1987

[54] POLYPHASE PHASE LOCK OSCILLATOR

[75] Inventors: Yasuyuki Okumura, Yokohama; Kazuhiro Hayashi, Yokosuka, both of Japan

[73] Assignee: Nippon Telegraph and Telephone Corp., Tokyo, Japan

[21] Appl. No.: 732,797

[22] PCT Filed: Feb. 2, 1985

[86] PCT No.: PCT/JP85/00043

§ 371 Date: Apr. 29, 1985

§ 102(e) Date: Apr. 29, 1985

[87] PCT Pub. No.: WO85/03610

PCT Pub. Date: Aug. 15, 1985

[30] Foreign Application Priority Data

Feb. 3, 1984 [JP] Japan .................................. 59-17114
Jan. 28, 1985 [JP] Japan .................................. 60-12542

[51] Int. Cl.⁴ .............................................. H04J 3/06
[52] U.S. Cl. ..................................... 370/100; 375/111
[58] Field of Search ....................... 370/100, 112, 77; 375/106, 111

[56] References Cited

U.S. PATENT DOCUMENTS 3,597,552  8/1971  Goto .................................. 370/100
4,189,622  2/1980  Foshee .............................. 375/111
4,290,135  9/1981  Zemanek ........................... 370/100
4,566,099  1/1986  Magerl .............................. 370/100

FOREIGN PATENT DOCUMENTS 54-32294  10/1979  Japan .
56-90648  7/1981  Japan .
56-90643  7/1981  Japan .
56-98962  8/1981  Japan .
57-57054  4/1982  Japan .

Primary Examiner—Douglas W. Olms
Assistant Examiner—Wellington Chin
Attorney, Agent, or Firm—Armstrong, Nikaido, Marmelstein & Kubovcik

[57] ABSTRACT

A polyphase phase lock oscillator for time division multiplexed reception signal which has a plurality of channels with some phase difference with one another; device comprises means (11) for detecting a frame bit; means (12) for providing a gate signal for separation of each channels; means (14-1, 14-2, 14-3) for regenerating recognition clocks for each channels corresponding to said gate signals; and means (15) for output of regenerating recognition clocks; and the present device provides regenerated recognition clocks which are phase-synchronized with all the channels of reception signal.

4 Claims, 29 Drawing Figures

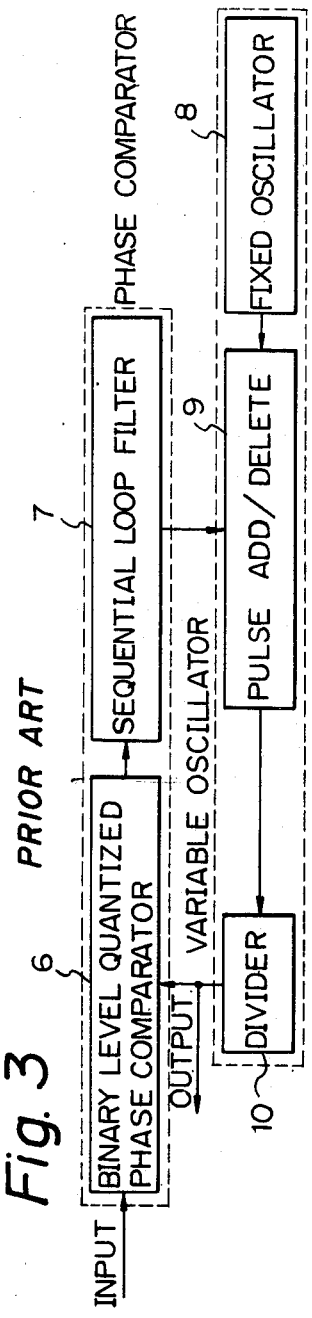
Fig. 3 *PRIOR ART*
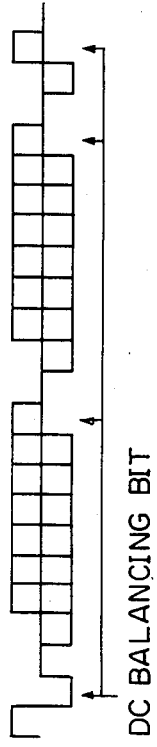
Fig. 5a
Fig. 5b

Fig. 4a  PRIOR ART
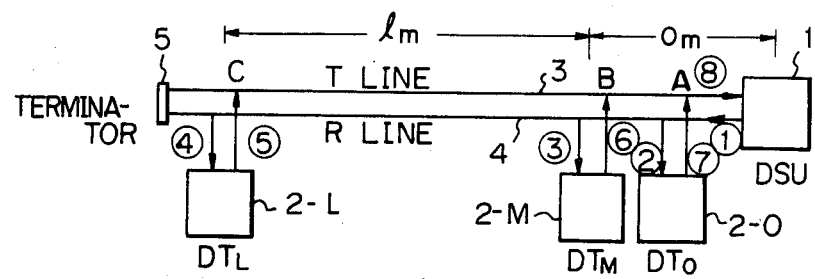
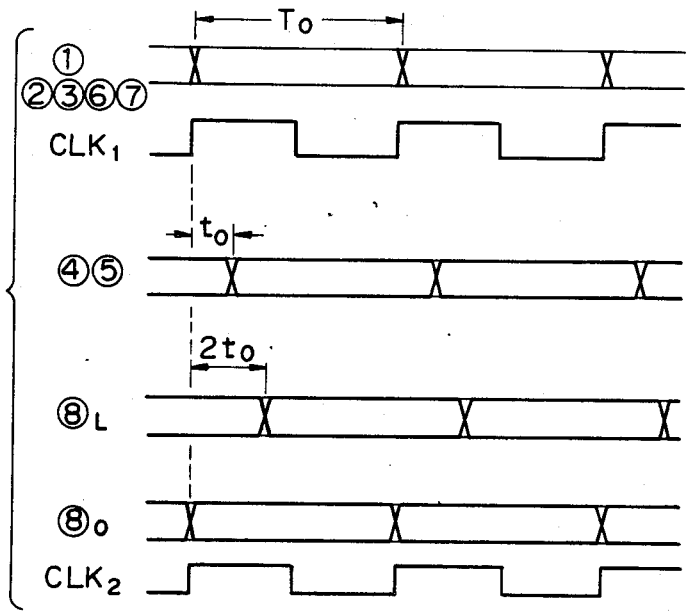
Fig. 4b  PRIOR ART

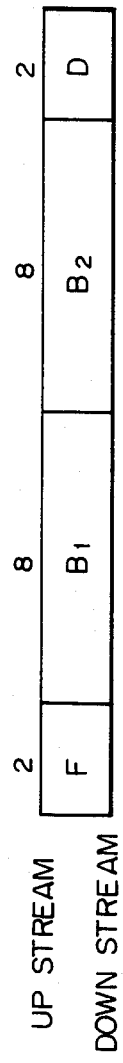
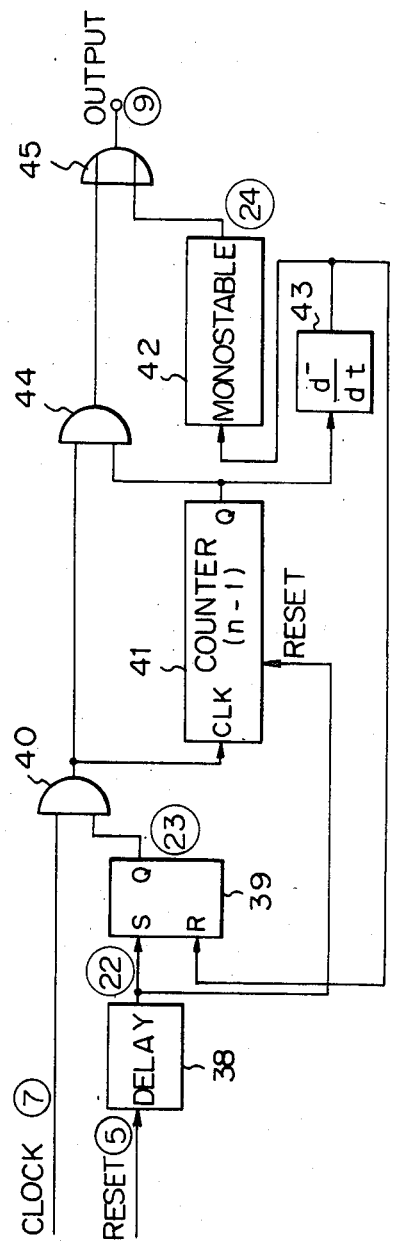
Fig. 10
Fig. 21

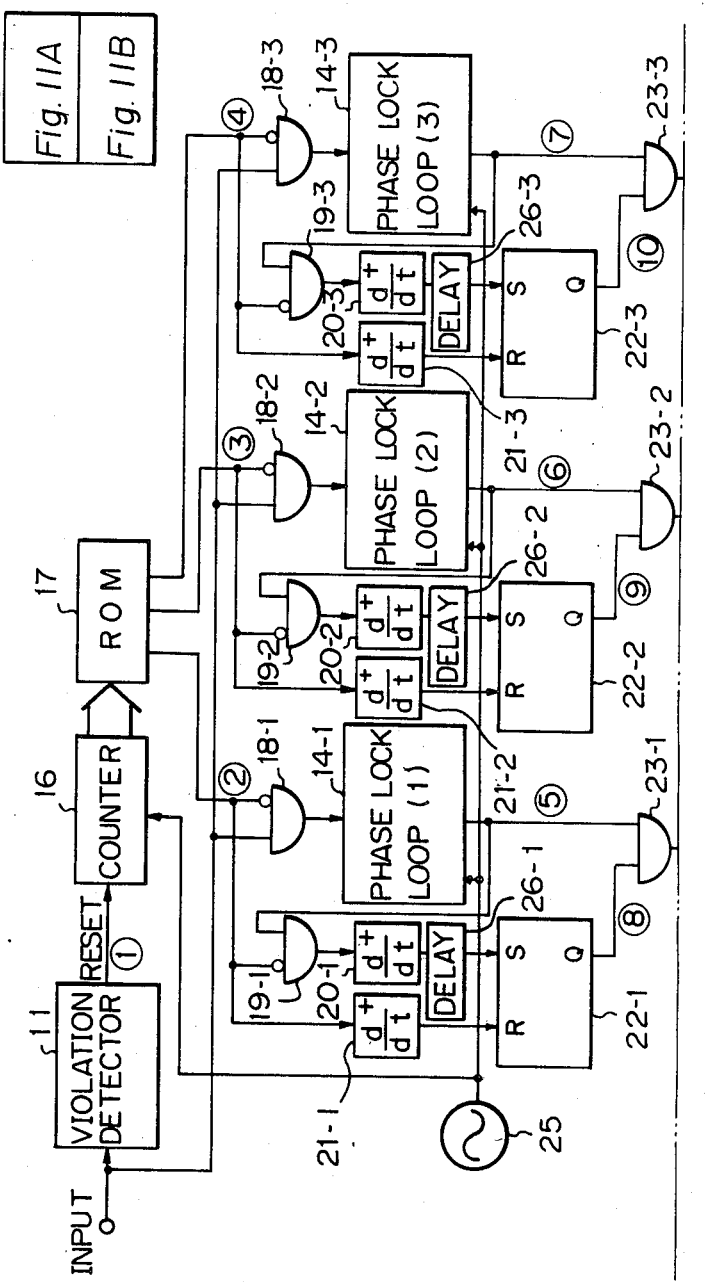

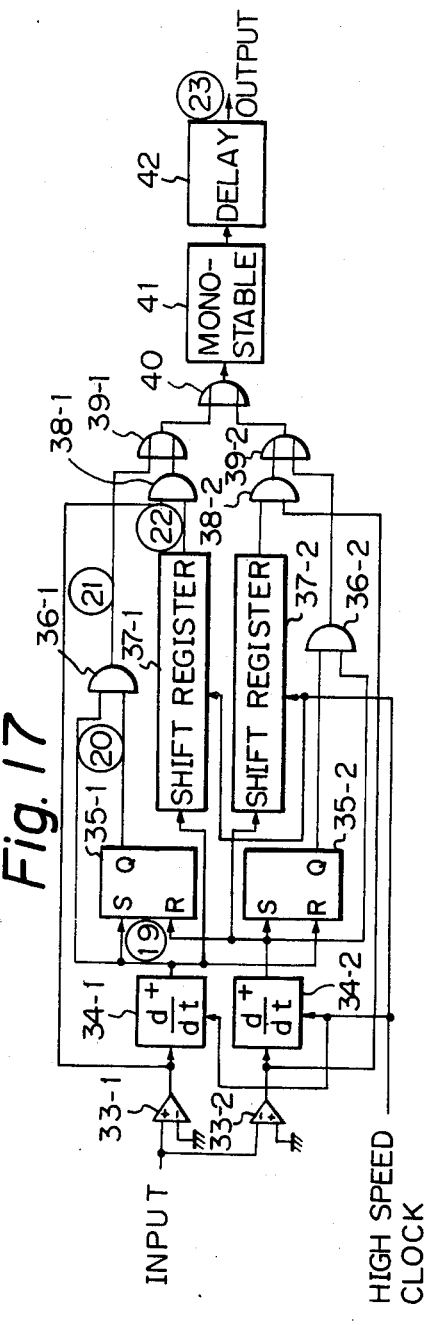
Fig. 17
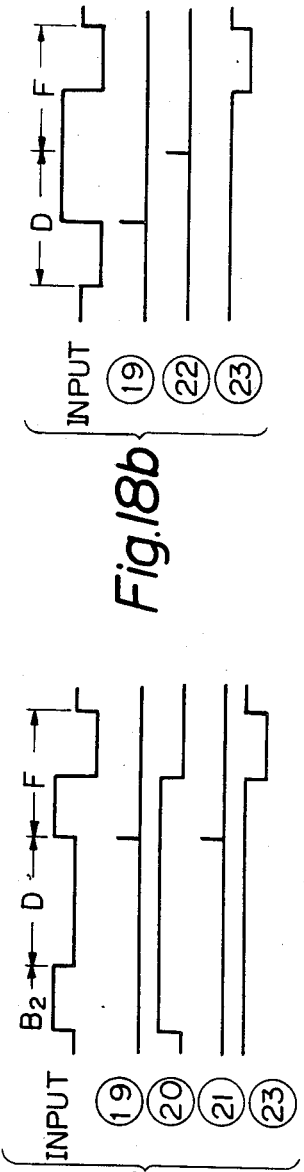
Fig. 18a
Fig. 18b

POLYPHASE PHASE LOCK OSCILLATOR

FIELD OF THE INVENTION

The present invention relates to a polyphase phase-locked oscillator in which a plurality of signal channels with some phase difference are transmitted with time division multiplex system, and a reception side receives the particular channel signal with phase synchronization.

When a sampling clock is to be derived in a time division multiplex transmissiion line in which a plurality of channel signals are multiplexed with some phase difference, the clock signal with the phase locked with the signal channel having high mark ratio is obtained. Accordingly, it has the disadvantage that the margin for recognition in other signal channels is decreased. The present invention provides a sampling clock signal locked with each signal channels so that the recognition margin is increased.

BACKGROUND OF THE INVENTION

A new kind of transmission system in which a plurality of signal channels are multiplexed with some phase difference is considered as a subscriber transmission system in an Integrated Service Digital Network (ISDN). In the ISDN transmission system, a bus line system between a digital service unit as a master station and a terminal apparatus as a slave station is considered promising in the number of necessary lines, the simple process for expanding, and less quantity of necessary hardware.

FIG. 1 shows a subscriber coupling system with a bus line schematically. In the figure, the numeral 1 is a digital service unit (DSU), 2-1 through 2-N are n number of terminal apparatuses, 3 is a T line (transmission line), 4 is an R line (reception line), 5 is a termination circuit. As shown, a plurality of terminal apparatuses are coupled with one another in a bus line. The T line and the R line show bus lines, and the R line is directed from the DSU to each terminal apparatuses, and the T line is directed from each terminal apparatuses to the DSU.

In a bus system for subscriber system, a simple bus system as shown in FIG. 2A (length between DSU and $DT_1$ is 0, and the length between $DT_1$ and $DT_n$ is about 100 m), an extended bus system as shown in FIG. 2B (the length between DSU and $DT_1$ is about 500 m, and the length between $DT_1$ and $DT_n$ is about 30 m), and a point-to-point system as shown in FIG. 2C (length between DSU and $DT_1$ is longer than 1000 m) are three typical ones. In FIGS. 2A through 2C, the same reference numerals as those of FIG. 1 show the same members.

The phase lock operation between a transmission side and a reception side in FIGS. 2A through 2C has been carried out as described below.

The DSU transmits a data to an R line like a broadcasting manner, and each subscriber apparatus derives clock component in reception data train for phase lock purposes. However, the reception phase at the DSU through the T line is not uniform, because the length between the DSU and each terminal apparatus differs for each terminal apparatus. Of course, it is preferable that a common DSU is used for the systems of FIGS. 2A through 2C. Accordingly, a 100% AMI code is used as a transmission code, and each terminal apparatus transmits not only an information data but also a frame bit which indicates the beginning of a frame, so that the DSU may derive a sampling clock by a conventional phase lock circuit.

FIG. 3 shows the configuration of a prior digital phase lock circuit. In the figure, the numeral 6 is a binary level quantized phase comparator, 7 is a sequential loop filter, 8 is a fixed oscillator, 9 is a circuit for pulse add and/or pulse delete, and 10 is a frequency divider. In FIG. 3, the phase comparator 6 compares the phase of an input signal with the output signal phase for every input bit, and provides output as $+1$ or $-1$, which is applied to the sequential loop filter 7 for improving the control reliability to control the circuit 9. The sequential loop filter 7 is usually composed of an up/down counter which is incremented by $+1$ input signal and is decremented by $-1$ input signal. The up/down counter provides an output signal when the content of the up/down counter reaches the predetermined value N or 0 (zero). The circuit 9 inserts a pulse to the output signal of the fixed oscillator 8, or removes a pulse from the output signal, according to the output of the up/down counter. The output of the circuit 9 is applied to the divider 10 which divides the pulses to provide a phased locked output signal.

FIG. 4 shows a prior phase lock system in a DSU unit having a prior phase lock circuit of FIG. 3. In the figure, FIG. 4A shows the configuration of the coupling, and the same reference numerals as those of FIG. 1 shows the same member, $DT_0$ is the closest terminal apparatus to the DSU, $DT_L$ is the farthest terminal apparatus from the DSU, and $DT_M$ is a terminal apparatus located between $DT_0$ and $DT_L$. FIG. 4B shows the time sequence of the signals in FIG. 3.

It is assumed that the length between DSU and $DT_0$ is 0, and the length between DSU and $DT_M$ is 0, and the length between DSU and $DT_L$ is $l_m$. Also, the frame structure of FIG. 5 is assumed. In the embodiment, each frame has 24 bits in 125 micro seconds, and the transmission speed is 192 kbps. In the figure, $B_1$ and $B_2$ are channels of 64 kbps, D is a channel of 16 kbps, F is a frame bit for indicating the head of the frame, G is a guard bit, and S is a spare bit. The guard bit G is transmitted as a high impedance mode of a driver in a transmission side. The frame structure using the 100% duty AMI code is shown in FIG. 5(b). Each individual channel is DC-balanced by a trailing balance bit. The terminal apparatuses $DT_0$ and $DT_M$ are designated the time slots $B_1$, and $B_2$, respectively, and the terminal apparatus $DT_L$ is designated the time slot D. When the DSU sends a data which is generated by the clock $CLK_1$ with the period $T_0$ to the R line with the phase (1) as shown in FIG. 4B, the data phases (2) and (3) at the input ends A and B of the terminal apparatuses $DT_0$ and $DT_M$ are equal to the phase (1), and the data phase (4) at the input C of the terminal apparatus $DT_L$ is delayed by $t_0$ from the phase (1). When the transmission delay of a cable is v(sec/m), the figure $t_0$ is expressed as $t_0 = v \times t$ (sec). The data transmission phase in each terminal apparatus to the T line is adjusted so that the transmission phase coincides with the reception phase in the R line. Accordingly, the transmission phase (5) in the terminal apparatus $DT_L$ is equal to the phase (4), the transmission phase (6) in the terminal apparatus $DT_M$ is equal to the reception phase (3), and the transmission phase (7) in the terminal apparatus $DT_0$ is equal to the reception phase (2). However, the reception phase at the DSU depends upon the location of each terminal apparatus, and the data phase $(8)_L$ from the terminal apparatus $DT_L$ delayed by $2t_0$ from the data phase (1), and the data phase $(8)_0$ from the terminal apparatuses $DT_0$ and $DT_M$ is almost the same as the data phase (1). In that case, the number of bits arrived at DSU with the data phase $(8)_L$ is 8 times $(=2\times(64/16))$ as many as those bits with the data phase $(8)_0$. In that case, the output phase-locked signal obtained by the circuit of FIG. 3 dependes mostly upon the data phase $(8)_0$ which has 8 times as many bits as that of data phase $(8)_L$, and the phase-locked clock $CLK_2$ is obtained.

Considering that the retiming margin is larger than $\frac{1}{4}$ time slot $(=0.25 T_0)$ for the deterioration of waveforms in a transmission line, the following equation must be satisfied so that the margin is provided to the data phase $(8)_L$.

$$2t_0 < 0.25T_0 \qquad (1)$$

As an ordinary cable has v=5 (nsec/m), and the transmission rate is 192 kbps, $t_0 < 650$ (nsec) is derived from the equation (1), and the allowable maximum length for correct reception is shown by the following equation.

$$L < t_0/v = 130 \text{ (m)} \qquad (2)$$

As shown in the equation (2), the length to a subscriber is severely limited in a prior art. That limitation is the serious disadvantage when an ISDN system is applied to a wide area of offices.

Further, a prior art has the disadvantage the margin of a sampling clock is small for the data phase $(8)_L$, and the error rate of that signal is deteriorated.

SUMMARY OF THE INVENTION

It is an object, therefore, of the present invention to overcome the disadvantages of a prior polyphase phase lock oscillator.

According to the present invention, in a data transmission system having a master station and a plurality of slave stations coupled with the master station through a bus system, the master station has a means for separating signal channels transmitted from each slave station a means for generating a sub-clock signal for each separated channel, and a means for providing a sampling clock which is the sum of the sub-clock signals. Details are described below in accordance with the drawings.

BRIEF DESCRIPTION OF THE DRAWINGS

FIG. 3 is a block diagram of a prior phase lock oscillator, FIGS. 4A and 4B are explanatory drawings for the explanation of the operation of FIG. 3, FIGS. 5(a) and 5(b) show the structure of a frame format used in the present invention, FIG. 10 shows another frame format for the present invention, FIGS. 11, 11A and 11B are block diagrams of another embodiment of the polyphase phase lock oscillator according to the present invention, FIG. 17 is a block diagram of a violation circuit in each of the above embodiments, FIGS. 18A and 18B show the operational timing sequence of the apparatus of FIG. 17, FIG. 21 is a block diagram of a clock phase shifter in FIG. 15.

DESCRIPTION OF THE PREFERRED EMBODIMENTS

Figure 1:
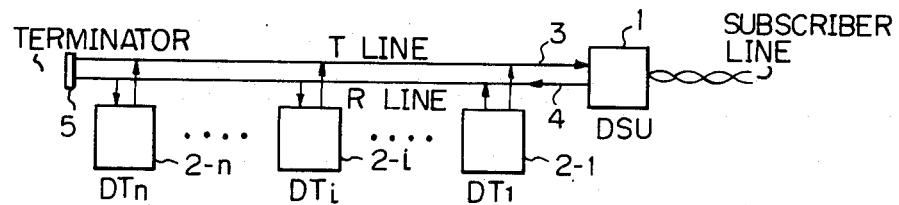
FIG. 1 is a schematic diagram of a subscriber coupling system using a bus line.
Figure 2A:
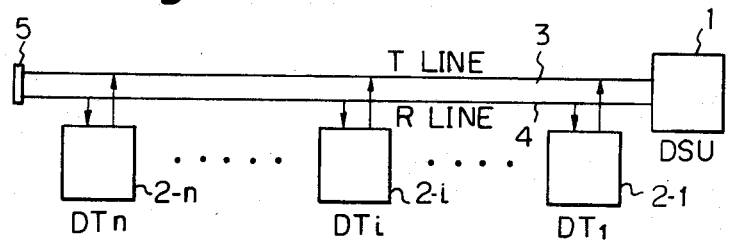
FIGS. 2A through 2C show some embodiments of practical coupling of a subscriber system.
Figure 2B:
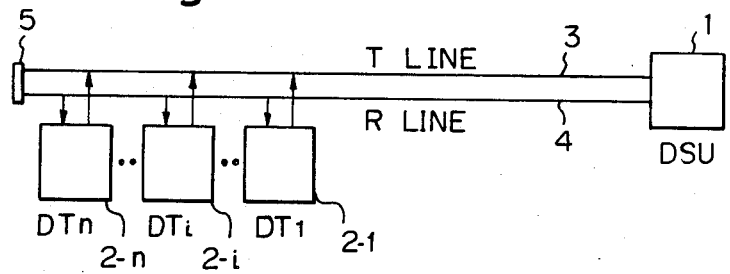
Figure 2C:
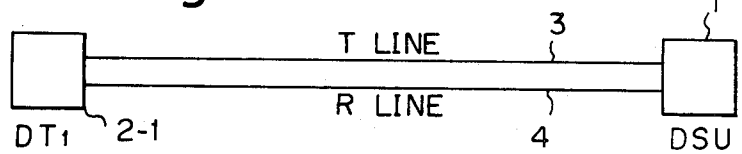
Figure 6:
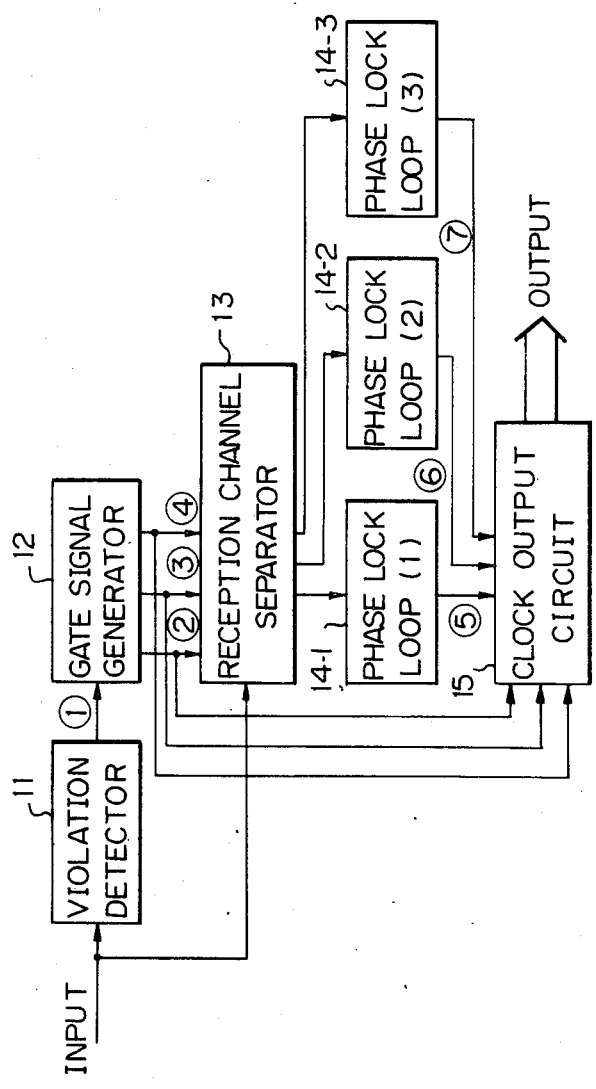
FIG. 6 is a brief block diagram of the polyphase phase lock oscillator according to the present invention.

FIG. 6 shows the brief block diagram of the present invention. The apparatus of FIG. 6 handles a signal format as shown in FIG. 5. In FIG. 6, the numeral 11 is a violation detector for detecting a violation for frame synchronization, 12 is a gate signal genertor, 13 is a reception channel separator, 14-1 through 14-3 are phase lock loops, and 15 is a clock combiner.

Figure 7:
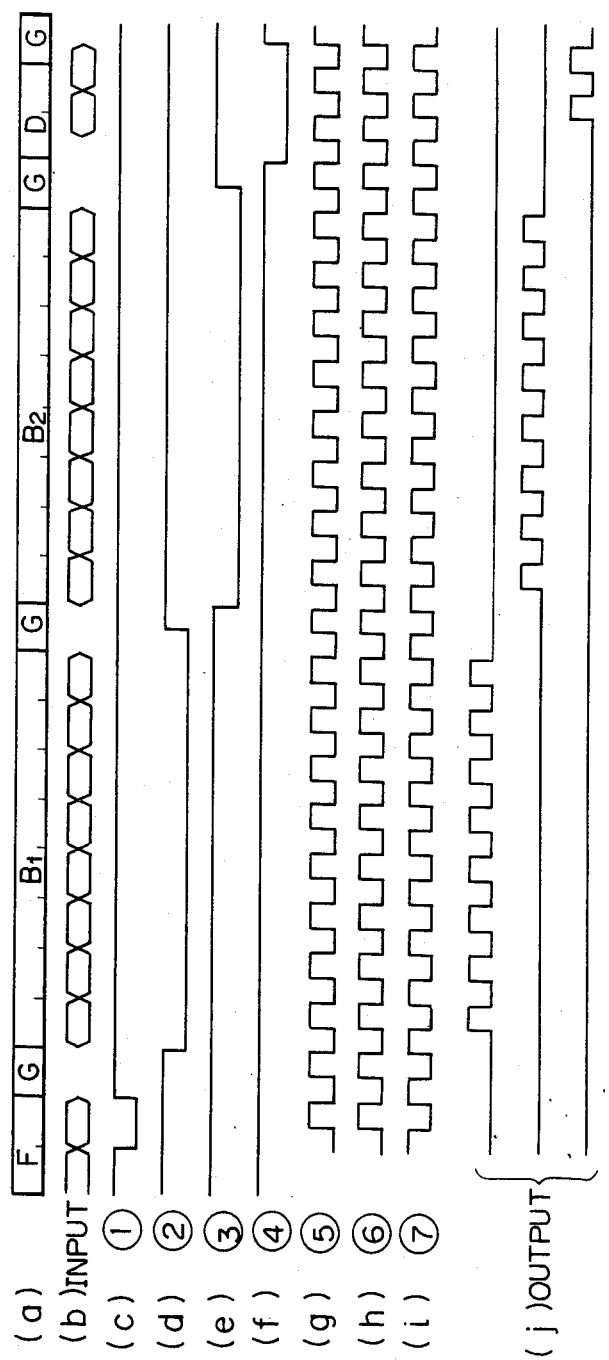
FIG. 7 shows the operational timing sequence of the apparatus of FIG. 6.

FIG. 7 shows the operational timing sequence of the apparatus of FIG. 6, and in FIG. 7, (1) is a frame synchronization signal provided by the violation detector 11, (2), (3) and (4) are gate signals for $B_1$ channel, $B_2$ channel, and D channel, respectively, (5), (6) and (7) are sampling clocks for $B_1$ channel, $B_2$ channel, and D channel, respectively. The same numerals as those of FIG. 6 are used in FIG. 7 for showing the signals indicated by the numerals.

It is assumed that the present system is used in one room for a dwelling house, or a business office, and has the channel configuration (2B+D, B; 64 kbps, D; 16 kbps). It is also assumed that the length between terminal apparatuses is in the range between 100 m and 150 m. However, it is preferable that the system is applicable when the length between terminal apparatuses is 200-250 m, considering a worse noise environment.

The signal phase shown in FIG. 7 shows the signal phase at the DSU when the closest $DT_0$ uses the $B_1$ channel, the closest $DT_M$ uses the $B_2$ channel, and the farest $DT_L$ uses the D channel, in FIG. 4. The transmission code is assumed to be 100% AMI, and the guard bit G is high impedance mode (no signal). An AMI violation is used as a frame synchronization signal, and the violation detector 11 detects the frame synchronization signal to provide the signal (1). It should be noted that the frame bit is sent from all the terminal apparatuses $DT_0$, $DT_M$ and $DT_L$, however, since the received pulse level from $DT_0$ and $DT_M$ is higher than that from $DT_L$, the frame bit phase at the DSU side coincides with the phase of the signal sent from $DT_0$ and $DT_M$. The gate signal generator 12 provides the gate signal (2), the gate signal (3), and the gate signal (4) for the channels $B_1$, $B_2$, and D, respectively, upon reception of the frame signal (1). Each gate signal is longer than the related channel duration by a 0.5 time slot, so that the gate signal generated according to the phase of the closest apparatus may cover the channel of the furthest apparatus. Using the input signal and the signals (2) through (4), the reception channel separator 13 sends the $B_1$ channel signal to the first phase lock loop 14-1, the $B_2$ channel signal to the second phase lock loop 14-2, and the D channel signal to the third phase lock loop 14-3. Each phase lock loop circuits (14-1, 14-2, 14-3) generates the clock (5) for $B_1$ channel, the clock (6) for $B_2$ channel, and the clock (7) for the channel D, respectively. Using the gate signals (2) through (4), and the clocks (5) through (7), the clock output circuit 15 provides the clock for the $B_1$ channel, the clock for the $B_2$ channel, and the clock for the D channel (see FIG. 7(j)).

Figure 8:
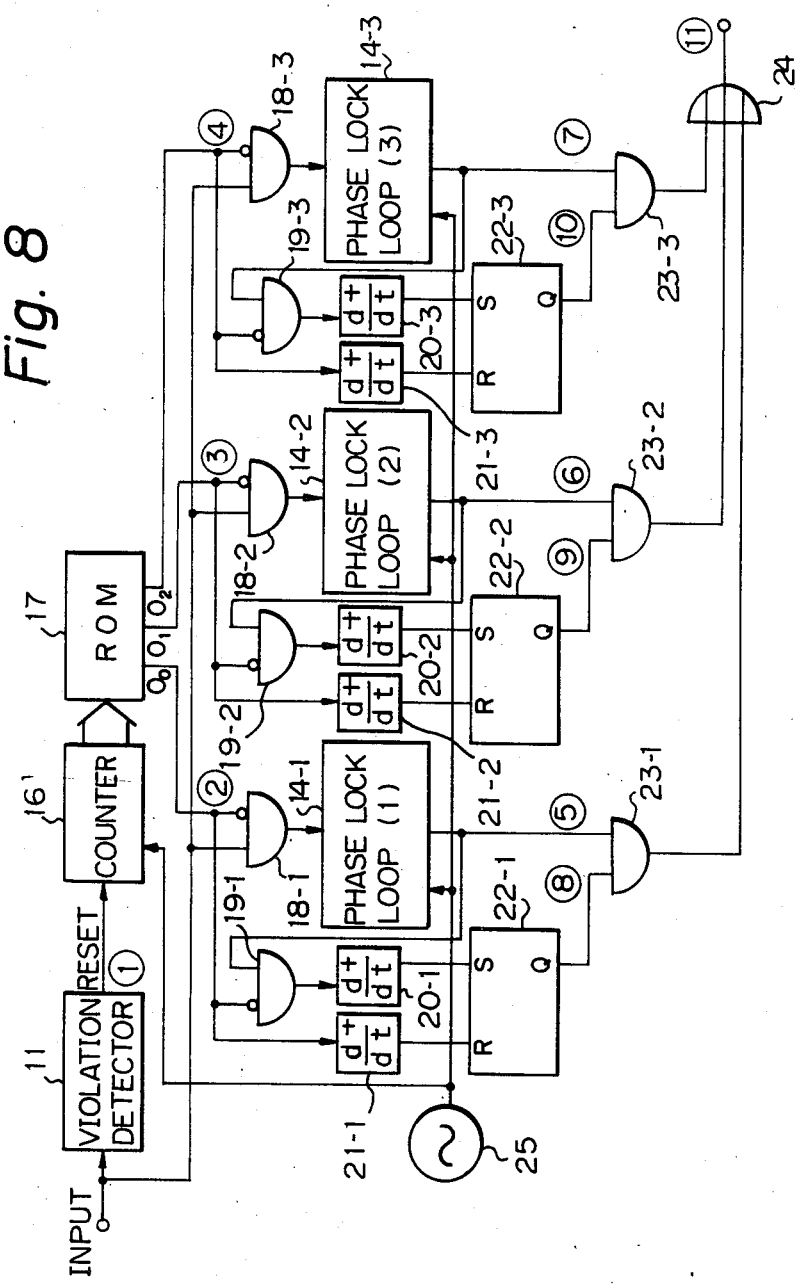
FIG. 8 is a block diagram of the embodiment of the polyphase phase lock oscillator according to the present invention.

FIG. 8 shows a block diagram of the practical embodiment according to the present polyphase phase lock oscillator. The apparatus of FIG. 8 handles the signal with the frame format of FIG. 5. In FIG. 8, the numeral 11 is a violation detector, 14-1 through 14-3 are phase lock loop circuits, 16 is a counter, 17 is a ROM (read only memory), 18-1 through 18-3, and 19-1 through 19-3 are AND circuits, 20-1 through 20-3, and 21-1 through 21-3 are signal rise detectors, 22-1 through 22-3 are RS flip-flops, 23-1 through 23-3 are AND circuits, 24 is an OR circuit with three inputs, and 25 is a fixed oscillator.

Figure 9:
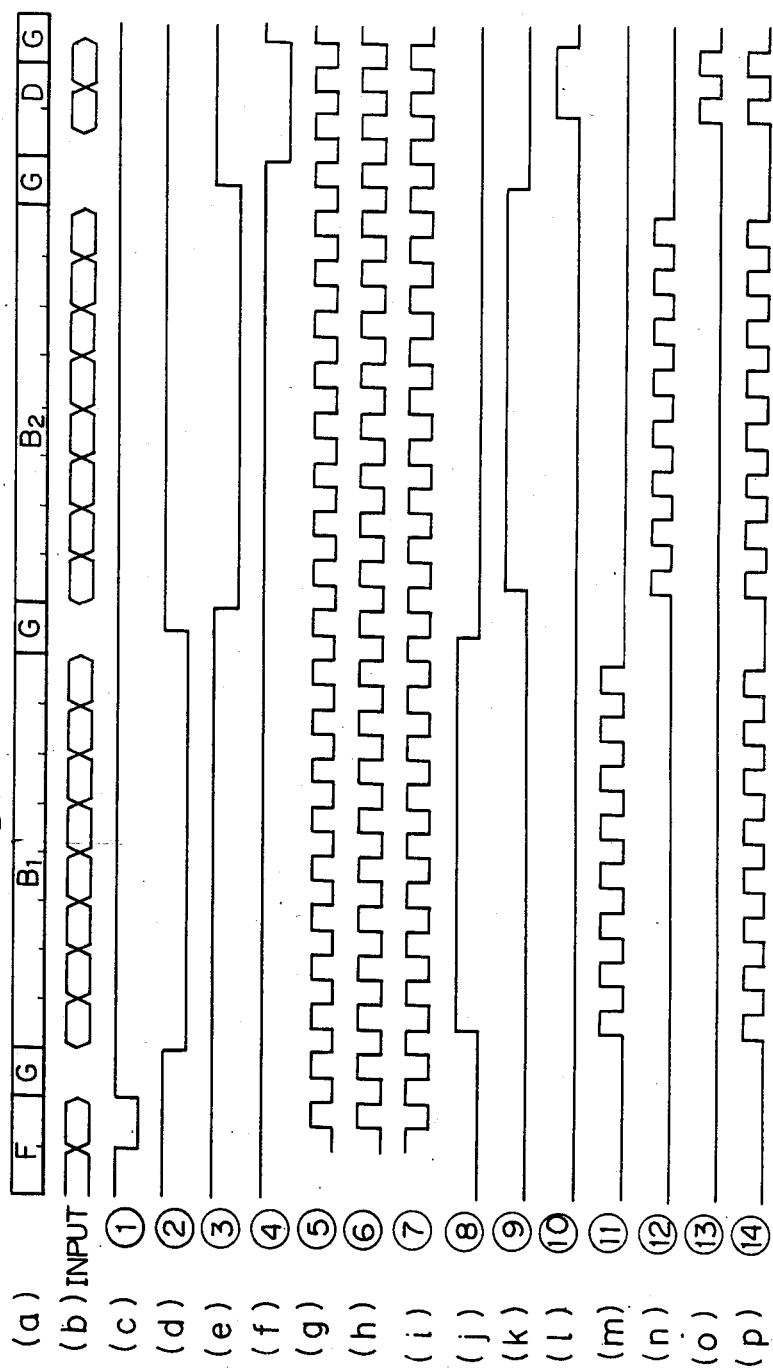
FIG. 9 shows the operational timing sequence of the apparatus of FIG. 8.

FIG. 9 shows the operational timing sequence of the apparatus of FIG. 8, and in FIG. 9, the numeral (1) is the frame synchronization signal provided by the violation detector 11, (2) is the gate signal for the $B_1$ channel, (3) is the gate signal for the $B_2$ channel, (4) is the gate signal for the D channel, (5) is the sampling clock for the $B_1$ channel, (6) is the sampling clock for the $B_2$ channel, (7) is the sampling clock for the D channel, (8), (9) and (10) are gate signals for combining the clocks for $B_1$ channel, $B_2$ channel, and D channel, respectively, (11), (12) and (13) are regenerated clocks for $B_1$ channel, $B_2$ channel, and D channel, respectively, and (14) is the combined sampling clock signal which is the sum of the signals (11), (12) and (13). A numeral in FIG. 9 shows the waveform at the location indicated by the same numeral in FIG. 8. The signal phase in FIG. 9 is the phase at the reception side at the DSU when the $B_1$ channel relates to the closest $DT_0$, the $B_2$ channel relates to the closest $DT_M$, and the D channel relates to the farthest $DT_L$. The transmission code in FIG. 8 is the 100% AMI code, and the guard bit G is the high impedance mode (no signal). An AMI violation is used as the detection of the frame synchronization signal, and the violation detector 11 detects the frame synchronization signal and generates the frame synchronization signal (1). The signal (1) is applied to the reset terminal of the counter 16 which is then reset to zero. The counter 16 measures the time duration from the reset signal (1), and the measured time is applied to the ROM 17. Then, the ROM 17 generates the gate signals (2), (3) and (4) for the $B_1$ channel, the $B_2$ channel, and the D channel, respectively. The input signal, and the inverted signals of the signals (2), (3) and (4) are applied to the AND circuits 18-1, 18-2, and 18-3, respectively, and the outputs of those AND circuits are applied to the phase lock loop circuits 14-1 through 14-3, respectively. The first phase lock loop circuit 14-1 which receives only the $B_1$ channel signal provides the clock (5) which is synchronized with an input signal in the $B_1$ channel. Similarly, the second phase lock loop circuit 14-2, and the third phase lock loop circuit 14-3 provide the clocks (6) and (7) for the $B_2$ channel, and the D channel, respectively. The flip-flop 22-1 is set to active status by the rise time of the gated clock (5), and the flip-flop 22-1 is reset to zero at the rise time of the gate signal (2). The flip-flop 22-1 provides the gate signal (8) which provides the clock signal for the sampling of the $B_1$ channel. Similarly, the second flip-flop 22-2 is set and reset at the rise time of the gated clock (6) and the rise time of the gate signal (3), respectively, to provide the gate signal (9) for the sampling of the $B_2$ channel. Similarly, the third flip-flop 22-3 is set and reset at the rise time of the gated clock (7) and the rise time of the gate signal (4), respectively, to provide the gate signal (10) for the sampling of the D channel. Finally, the AND circuit provides the logical product of the output (5) of the first phast lock loop 14-1 and the output (8) of the first flip-flop 22-1, the AND circuit 23-2 provides the logical product of the output (6) of the second phase lock loop 14-2 and the output (9) of the flip-flop 22-2, and the AND circuit 23-3 provides the logical product of the output (7) of the phase lock loop 14-3 and the output (10) of the flip-flop 22-3. The outputs of those AND circuits 23-1, 23-2 and 23-3 are applied to the OR circuit 24 which provides the combined sampling clock output (14). In a modification of the embodiment, the separated sampling pulses (11), (12), and (13) are obtained separately, instead of the combined sampling clock (14).

The outputs $O_0$, $O_1$ and $O_2$ of the ROM 17 in FIG. 8 depend upon the address signal to the ROM, and are shown below.

| Address | $O_0$ | $O_1$ | $O_2$ |
| --- | --- | --- | --- |
| $B_1$ and Gx0.5TS | 0 | 1 | 1 |
| $B_2$ and GxTS | 1 | 0 | 1 |
| D and Gx0.5TS | 1 | 1 | 0 | where $B_1$, $B_2$ D and G are the content of the counter shown in FIG. 9(a), and TS is the time slot length.

FIG. 10 shows the frame configuration which is used in the second embodiment of the present invention, and $B_1$ and $B_2$ are channels with 64 kbps, D is the channel with 16 kbps, and F is the frame bit which indicates the beginning of a frame. The feature of FIG. 10 as compared with that of FIG. 5 is that FIG. 10 has no guard bit G nor spare bit S. It is assumed in the present embodiment that each frame has 20 bits in 125 microseconds, and the transmission speed is 160 kbps.

Figure 11B:
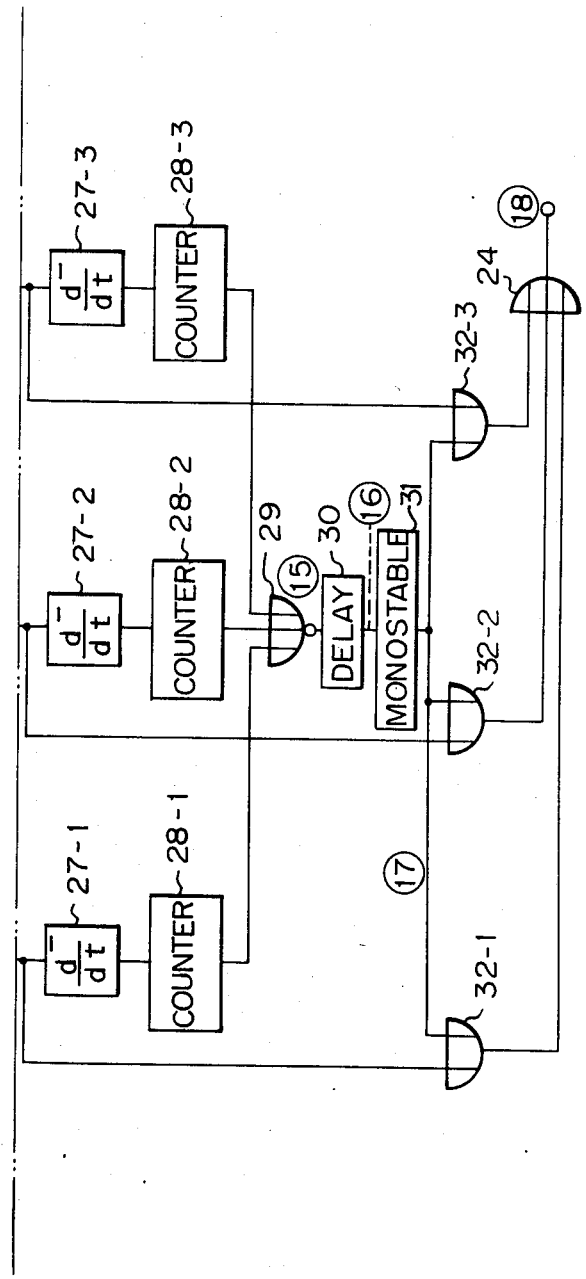

FIG. 11 is a block diagram of another embodiment of the present polyphase phase lock oscillator. The same numerals as those in FIG. 8 show the same members as those in FIG. 8, and the operation of those members is the same as those of FIG. 8. Further, the numeral 26-1 through 26-3 in FIG. 11 is delay circuits, 27-1 through 27-3 are fall time detectors, 28-1 through 28-3 are counters, 29 is a NOR circuit 30 is a delay circuit, 31 is a monostable multivibrator, 32-1 through 32-3 are OR circuits.

Figure 12:
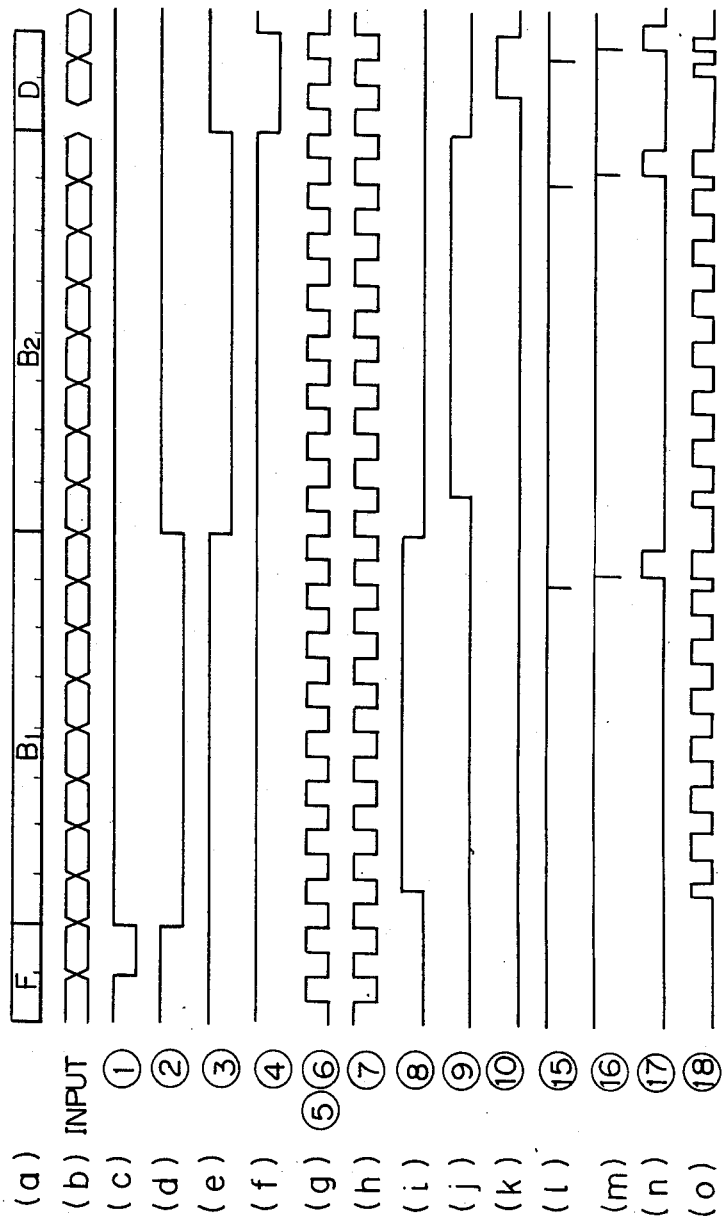
FIG. 12 shows the operational timing sequence of the apparatus of FIG. 11.

FIG. 12 shows the operational timing sequence of the apparatus of FIG. 11. The embodiment of FIGS. 11 and 12 has the assumption of FIG. 4 as is the case of the previous embodiment. In FIG. 12, the signals (1)

through (10) are the same as those of the same numerals in FIG. 9. The signal (15) in FIG. 12 is the last bit detection signal in each channel, 16 is the delayed signal delayed by ¼ phase from the signal (15), 17 is the sampling clock for the last bit, 18 is the combined sampling clock. The signals in FIG. 12 relate to the same numerals in FIG. 11. The process for obtaining the signals (1) through (7) is the same as that of FIG. 9. The differential circuit 20-1 detects the rise time of the gated clock in the $B_1$ channel phase, and the output of the differential circuit 20-1 is applied to the flip-flop 22-1 to set the same through the delay circuit 26-1 which delays an input signal by ¼ phase. The reset signal of the flip-flop 22-1 is obtained similarly to the case of FIG. 9. Accordingly, the rise time of the gate signal (8) is delayed by ¼ phase as compared with that of FIG. 9, and then, the rise time of the first bit of the clock which is obtained through the AND circuit 23-1 is also delayed by ¼ phase. Similarly, the gate signal (9) for the sampling of the $B_2$ channel, and the gate signal (10) for the sampling of the D channel are delayed by ¼ phase as compared with those of FIG. 9. Those gate signals (9) and (10) are applied to the AND circuits 23-2 and 23-3, respectively.

Therefore, the first bit of the clock pulse obtained at the outputs of the AND circuits 23-1, 23-2 and 23-3 is delayed by ¼ phase as compared with that of FIG. 9.

On the other hand, another differential circuit 27-1 detects the fall point of the sampling clock for the $B_1$ channel obtained at the output of the AND circuit 23-1, and the output of the differential circuit 27-1 is applied to the counter 28-1, which applies an output signal to the NOR circuit 29 when the counter 28-1 counts the input signal by 7 (=(number of bits in $B_1$ channel)−1). Similarly, the counters 28-2 and 28-3 apply the last bit phase detection signals of the $B_2$ channel, and the D channel, respectively, to the NOR circuit 29. The NOR circuit 29 provides the output signal (15), which is delayed by ¼ phase in the delay circuit 30 which provides the delayed signal (16). The signal (16) is applied to the monostable multivibrator 31 as a trigger signal. The duration of the output signal of the monostable multivibrator 31 is adjusted to be ¼ time slot beforehand. The output of the monostable multivibrator 31 is the sampling clock for the last bit for each channel ($B_1$, $B_2$ and D). The output signal for the sampling of the last bit from the monostable multivibrator 31 is applied to the OR circuits 32-1, 32-2 and 32-3, which also receive the sampling clocks for each channel ($B_1$, $B_2$ and D). The outputs of the OR circuits (32-1, 32-2 and 32-3) are applied to the OR circuit 24 which combines those clock signals to provide the combined clock signal (18). The output clock signal (18) is synchronized with all the reception channels ($B_1$, $B_2$ and D). As described above, the output clock (18) has the feature as compared with the embodiment of FIG. 8, that the first bit for each channel is delayed by ¼ time slot, and the last bit for each channel is lead by ¼ slot time so that the last bit of a former channel does not overlap with a first bit of a following channel even when no guard bit is provided as is the case of FIG. 10. It should be appreciated that the amount of the lead and/or the lag of the last bit and/or the first bit is adjusted according to distortion of reception signal, although the embodiment assumed the amount of ¼ time slot.

Figure 13:
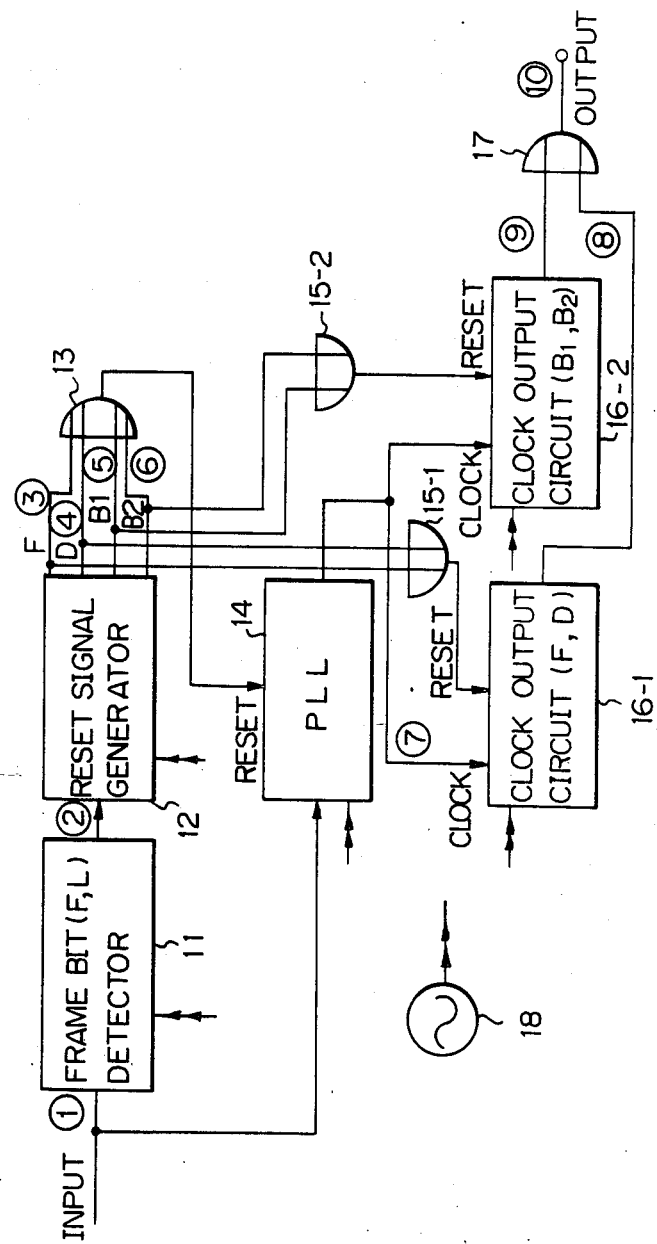
FIG. 13 is a block diagram of still another embodiment of the polyphase phase lock oscillator according to the present invention.
Figure 14:
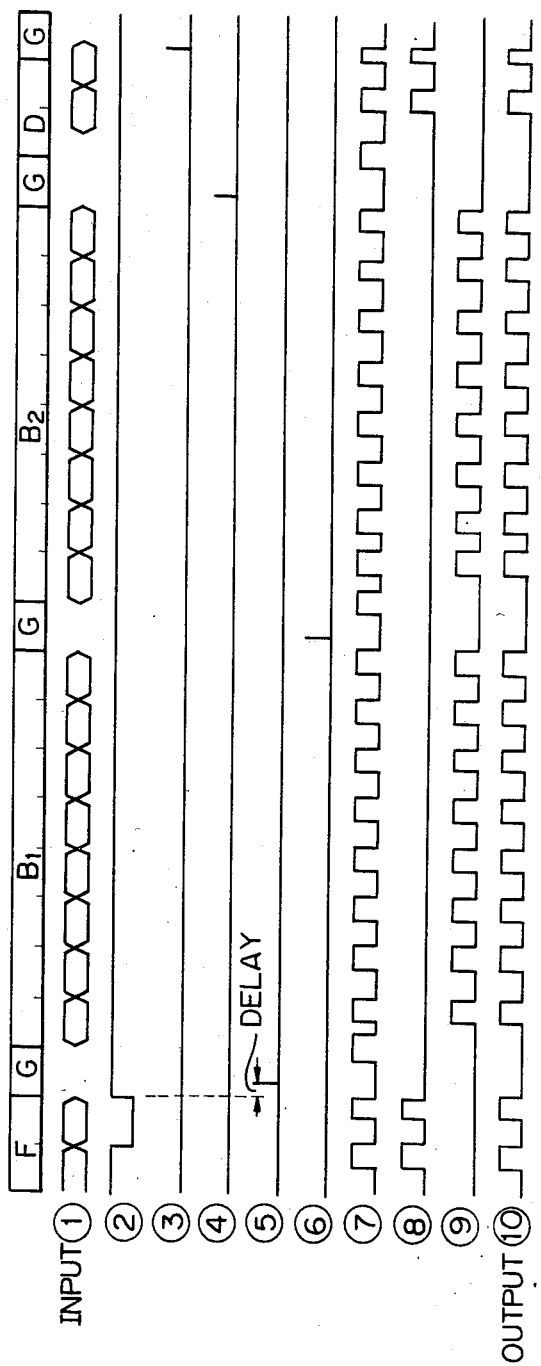
FIG. 14 shows the operatonal timing sequence of the apparatus of FIG. 13.

FIG. 13 is a block diagram of still another embodiment of the polyphase lock oscillator according to the present invention. FIG. 13 uses the frame format of FIG. 5. In FIG. 13, the numeral 11 is a frame bit detector, 12 is a PLL reset signal generator, 13 is a four-inputs OR circuit, 14 is an instantaneous follow type PLL (phase lock loop) circuit, 15-1, 15-2 and 17 are two-inputs OR circuits, 16-1 and 16-2 are clock output circuits, and 18 is a fixed oscillator. FIG. 14 shows the operational timing sequence of the apparatus of FIG. 13. In FIG. 14, the signal (1) is an input signal to the present polyphase phase lock oscillator, the signal (2) is a frame bit detection signal provided by the frame bit detector 11, the signals (3), (4), (5) and (6) are reset signals just before the PLL 14 receives the signals of the frame bit, the D channel, the $B_1$ channel, and the $B_2$ channel, respectively. The signal (7) is a clock pulse which is provided by the PLL 14, (8) is a sampling clock for a frame bit and D channel, (9) is a sampling clock for $B_1$ channel and $B_2$ channel, (10) is an output clock which is the combination of (8) and (9). The numerals in FIG. 14 correspond to the same numerals in FIG. 13.

The channel structure (2B+D, B; 64 kbps, D; 16 kbps) of the present embodiment is suitable for the application to a dwelling house and/or one office room, in which the requested maximum length between terminal apparatuses is 100–150 m. Therefore, it is preferable that the system is applicable up to 200–250 m, considering the deterioration of noise environment.

The signal phase shown in FIG. 14 shows the case that the system configuration as shown in FIG. 4 is used, each phase is the one at the reception end at DSU, the closest terminal apparatus $DT_0$ is allocated to $B_1$ channel, the closest $DT_M$ is allocated to $B_2$ channel, and the farest terminal apparatus $DT_L$ is allocated to the D channel. The transmission code is 100% AMI code as is the case in the previous embodiment, and a guard bit G is in high impedance mode (no signal). An AMI violation is used to detect a frame bit for frame synchronization, and the frame bit detector 11 detects the frame bit, and provides a frame bit detection signal (2). It should be noted that all the apparatuses $DT_0$, $DT_M$ and $DT_L$ transmit a frame bit, however, since the pulse level of the frame bit by the closest apparatuses $DT_0$ and $DT_M$ is higher than that by the farther terminal $DT_L$, the frame bit phase at the reception end of the DSU coincides with the phase of the frame signal transitted by $DT_0$ and $DT_M$. The reset signal generator 12 provides the reset signals (3), (4), (5) and (6) for frame bit, D channel, $B_1$ channel, and $B_2$ channel, respectively, upon receipt of the signal (2). Each reset signal is provided at the timing of a guard bit G, which is just before the beginning of the related channel. The phase of the reset signal is lagged by $(\alpha) \times T_0$ ($0.25 < (\alpha) < 0.35$, $T_0$; one time slot width) as compared with the detected frame bit phase. The reason for that is that the initial phase is set just before a clock is derived from each channel signal, and that the phase difference between the initial phase and the most delayed phase by the farthest apparatus might be small to reduce the error in the PLL. Generally, when the error is the PLL exceeds $0.5 \times T_0$, the number of clock pulses in a frame is increased or decreased, and the synchronized condition is destroyed. By setting the initial phase as described above, the synchronized condition is kept even when the system receives the phase delayed by ($0.75T_0 - 0.8T_0$) in the present invention. The PLL 4 is reset by the signal which is the combination of the reset signals (3), (4), (5) and (6). The PLL 14 is an instantaneous follow type which has no filter, so that it can operate even when a flag pattern for phase synchronization is short like a packet mode signal. The clock output circuit 16-1 is for a frame channel and the D channel, and the clock output circuit 16-2 is for B₁ channel and B₂ channel. The clock pulse (8) is obtained from the clock pulse (7) for the frame channel and the D channel, and the clock pulse (9) is obtained from the clock (7) for the B₁ channel and the B₂ channel. The final sampling clock (10) is the combination of the clocks (8) and (9).

Figure 15:
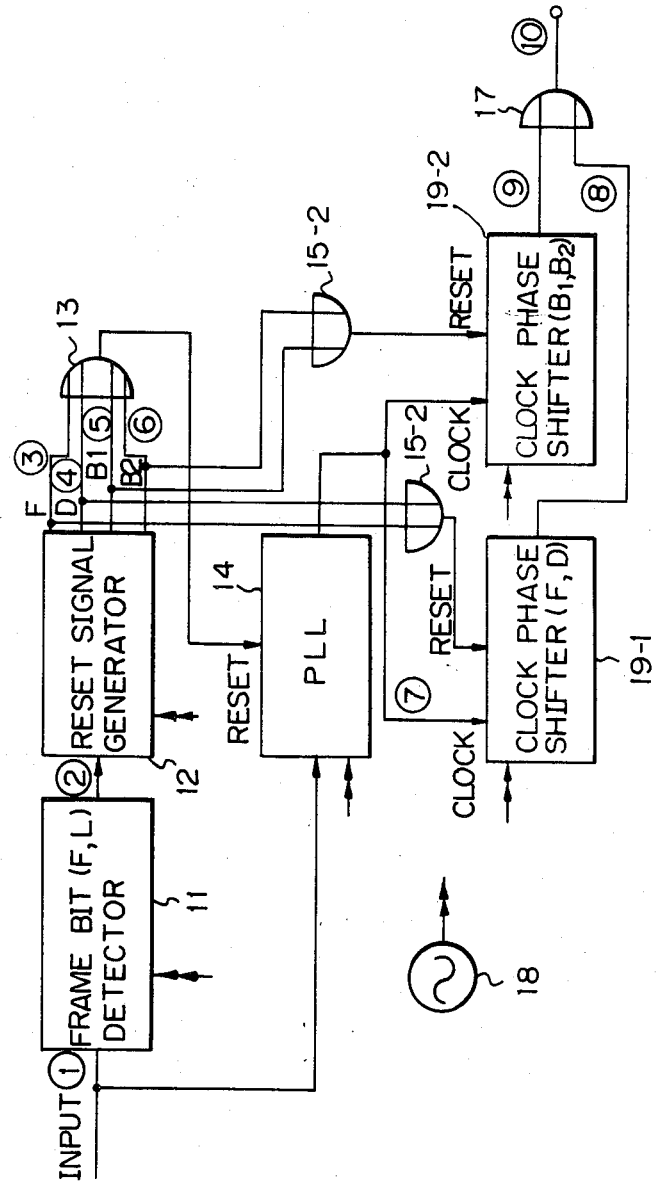
FIG. 15 is a block diagram of still another embodiment of the polyphase phase lock oscillator according to the present invention.

FIG. 15 is a block diagram of the fourth embodiment of the polyphase phase lock oscillator according to the present invention. The frame structure utilized in the present embodiment is the same as that shown in FIG. 10. In FIG. 15, the same numerals as those in FIG. 13 show the same members as those in FIG. 13. The numerals 19-1 and 19-2 in FIG. 15 are clock phase shifters.

Figure 16:
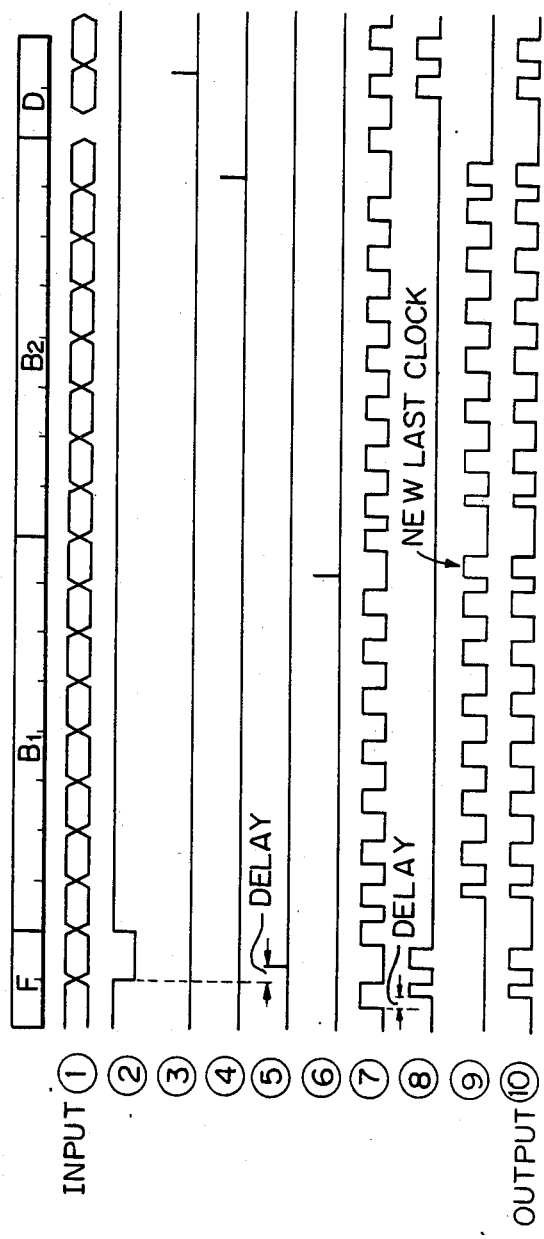
FIG. 16 shows the operational timing sequence of the apparatus of FIG. 15.

FIG. 16 shows the operational timing sequence of the apparatus of FIG. 15, which is used in the system of FIG. 4A. The same numerals in FIG. 16 as those in FIG. 14 have the same meaning as those in FIG. 14. In FIG. 16, the signal (8) is obtained by deriving a frame clock and a D channel clock in the clock (7), and delays the clock phase of the first bit of each channel and leads the clock phase of the last bit of each channel. The signal (9) is obtained by deriving a clock for B₁ channel and B₂ channel from the clock signal (7), and processing the derived signal for the first bit and the last bit similar to the signal (8). The signal (10) is the combination of the signals (8) and (9), and is used as the sampling clock of the whole reception channels. The clock (10) coincides with the phase of the reception channels for each channel. And, the signal (10) has the feature that the clock phase of the first bit in each channel is lagged, and the clock phase of the last bit in each channel is lead, so that the present system can be used for the frame structure of FIG. 10 which has no guard bit between channels. The amount of the lag of the first bit, and/or the lead of the last bit is designed according to the distortion of each reception channel.

In the above embodiments, when the recognition margin of a sampling clock at the DSU apparatus is ¼ time slot, the allowable phase distortion of the input signal to the DSU is ½ time slot. Accordingly, the following equation is obtained, corresponding to the previous equation (1).

$$2t_0 < 0.5T_0 \quad (3)$$

According to the present invention, the allowable length between terminal apparatuses is 260 m irrespective of the presence or non-presence of a guard bit, when the system of FIG. 4A in the transmission rate of 192 kbps is used.

FIG. 17 is a block diagram of the violation detector 11 in each previous embodiments. In the figure, the numeral 33-1 and 33-2 are comparators, 34-1 and 34-2 are leading edge detectors, 35-1 and 35-2 are RS flip-flops, 36-1, and 36-2, 38-1 and 38-2 are AND circuits, 37-1 and 37-2 are shift registers, 39-1, 39-2 and 40 are OR circuits, 41 is a monostable multivibrators, and 42 is a delay circuit. The operation of the violation circuit of FIG. 17 is shown in FIG. 18. FIG. 18A shows the case that there are more than 1 bit duration before a violation occurs, and FIG. 18B shows the case that the violation occurs immediately. FIG. 18 shows the case that the violation occurs in positive side, and it should be noted that the operation is similar when the violation occurs in negative side.

When there are more than one bit duration before violation (FIG. 18A), the signal (19) which is the leading edge indicator of an input signal, is applied to a set input of the RS flip-flop 35-1, which also receives the trailing edge indicator at the reset input of the same. Therefore, the signal (20) at the output Q of the RS flip-flop 35-1 is H (high) level from the reception of the positive side signal to the reception of the negative side signal.

If a positive rise signal exists during said Q output (20) is in H level, the violation detection signal (21) is provided. That signal (21) causes the signal (23) which has the L level at the latter half portion of the F bit, through the monostable multivibrator 41 and the delay circuit 42.

On the other hand, when the violation occurs immediately (FIG. 18(b)), the positive rise signal (19) of an input signal is applied to the shift register 37-1, which has N number of steps when the high speed clock is N times as high as the input signal. Then, the delayed positive rise signal (22) which is delayed by one bit, is applied to the AND circuit 38-1, which also receives the positive signal of the input signal. The output of the AND circuit is the violation detection signal.

Figure 19:
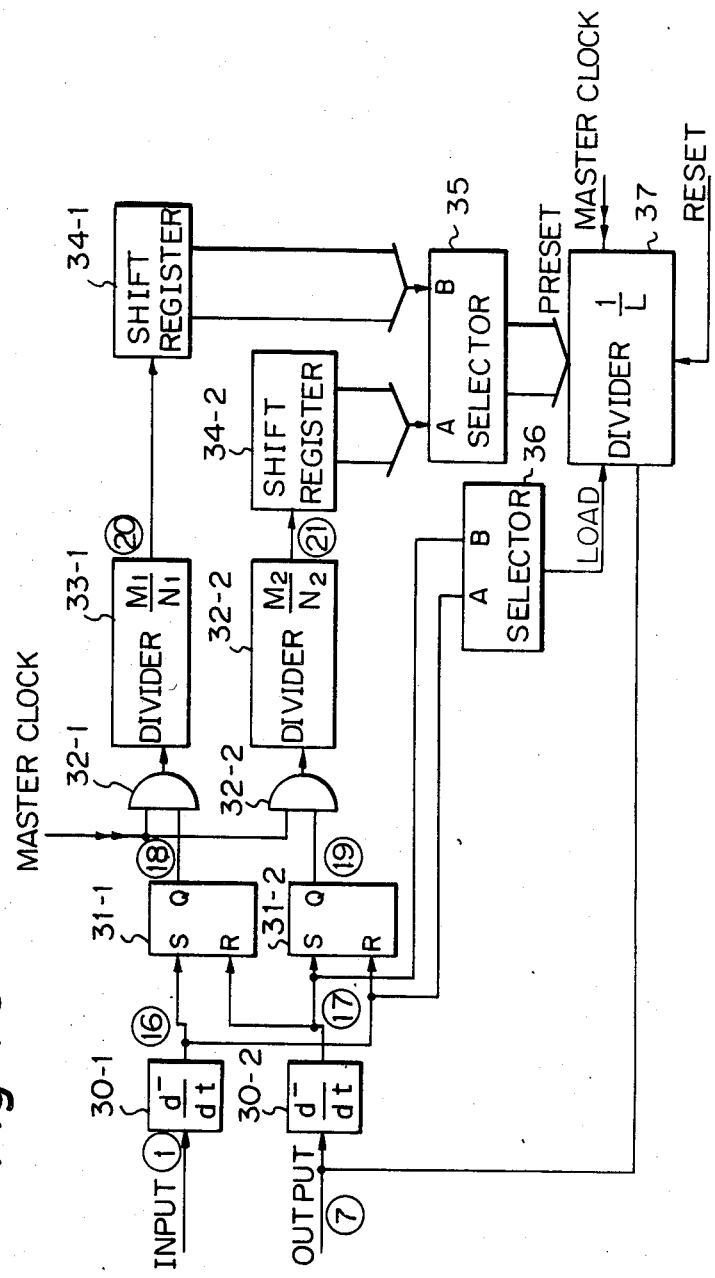
FIG. 19 is a block diagram of an instantaneous follow type PLL circuit.

FIG. 19 is a block diagram of the instantaneous follow type PLL which is conformed of a digital circuit. In the figure, the numerals 30-1 and 30-2 are trailing edge detection circuits, 31-1 and 31-2 are RS flip-flops, 32-1 and 32-2 are AND circuits, 33-1, 33-2 and 37 are dividers, 34-1 and 34-2 are shift registers, 35 is a selector with a plurality of inputs, and 36 is a selector with one input. The operational time chart of the apparatus of FIG. 19 is shown in FIG. 20, in which (a) shows the case that the output clock phase leads to the input phase, and (b) shows the case that the output clock phase is lag to the input phase.

Figure 20A:
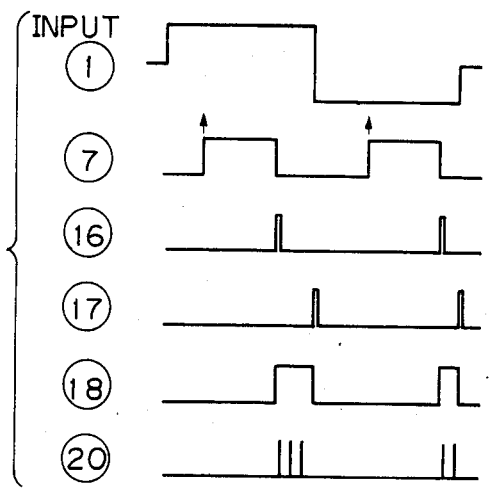
FIG. 20 shows operational timing sequence of the apparatus of FIG. 19.

When the output clock phase leads to the input signal phase (FIG. 20(a)), the trailing edge indicator (16) of the output clock is applied to the set input of the RS flip-flop 31-1, and the trailing edge indicator (17) of the input signal is applied to the reset input of the same. Therefore, The Q output (18) of the RS flip-flop is in H level during the difference between the input signal phase and the clock phase. The number of the master clock pulse whick is masked by the Q output (18) and the AND circuit 32-1 is adjusted by the divider 33-1. The output (20) of the divider 33-1 is converted to a parallel form by the shift register 34-1, then, applied to the divider 37 as a preset value through the selector 35. The clock phase lags by said preset value.

Figure 20B:
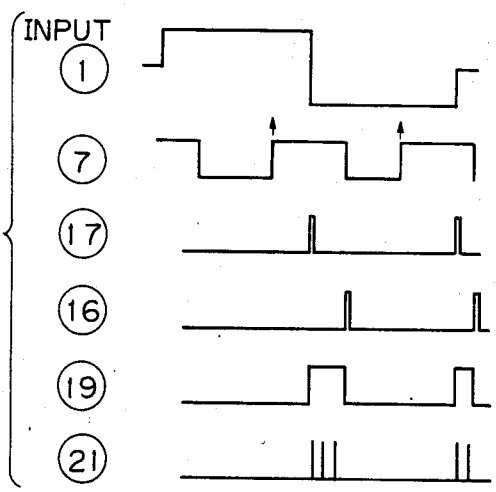

When the output clock phase is lagged to the input signal phase (FIG. 20(b)), the trailing edge indicator (17) of the input signal is applied to the set input of the RS flip-flop 31-1, which also receives the trailing edge indicator (16) of the input signal at the reset signal. Therefore, the Q output (19) of the RS flip-flop is in H level by the lag time of the output clock phase as compared with that of the input signal phase. The master clock pulse which is masked by the Q output (19) and the AND circuit 32-2 is applied to the divider 33-2, which adjusts the number of the pulses of the master clock. The output (21) of the divider 33-2 is converted to a parallel form by the shift register 34-2, then, applied to the divider 37 as a preset value through the selector 35. The clock phase leads by the preset value. The division ratio $M_1/N_1$ of the divider 33-1, and the division ratio $M_2/N_2$ of the divider 33-2 determine the amount of lag phase, and the amount of the lead phase, respectively of the output clock phase. Since it has no sequential loop filter, the clock phase for a next bit is determined by difference between a reception signal bit phase and a clock phase, and therefore, an instantaneous follow operation is achieved.

FIG. 21 is a block diagram of a clock phase shifter 19-2 for $B_1$ channel and $B_2$ channel. In the figure, the numeral 38 is a delay circuit, 39 is an RS flip-flop, 40 and 44 are AND circuits, 41 is a counter, 42 is a monostable multivibrator, 43 is a trailing edge detector, and 45 is an OR circuit. The operational time chart is shown in FIG. 22.

Figure 22:
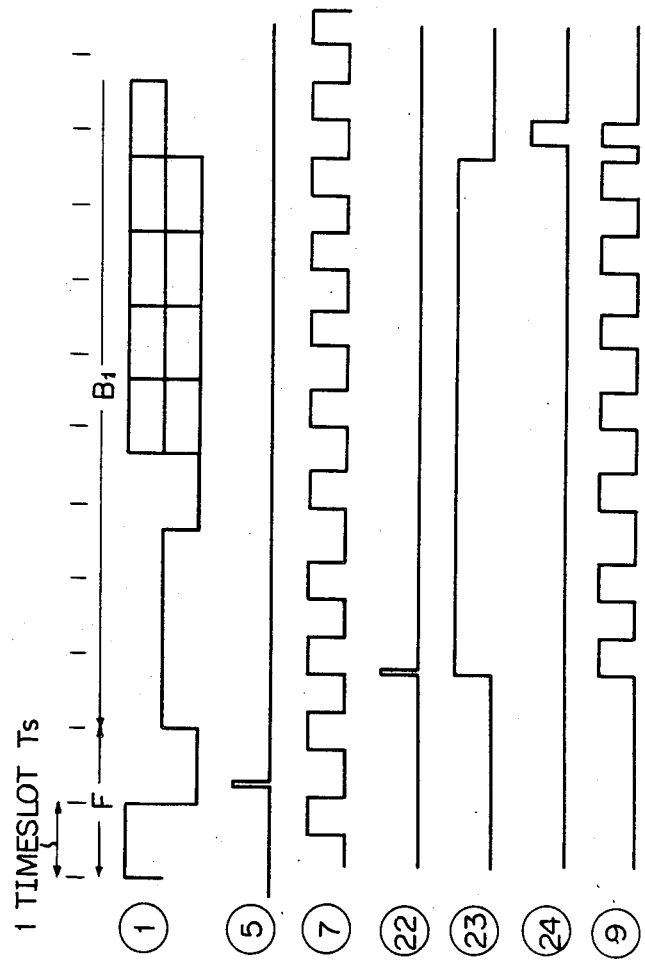
FIG. 22 shows the operational timing sequence of the apparatus of FIG. 21.

Although FIG. 21 shows the case for $B_1$ channel and $B_2$ channel, the apparatus for F, and D channel is obtained merely by changing the counter 41 to the single step counter, and the operation is the same as that of FIG. 22, except for the full count number of the counter.

The reset signal (5) of the PLL is delayed by about 1.5 time slot in the delay circuit 38, and is applied to the set input of the RS flip-flop. Exactly speaking, the amount of the delay is determined by the clock phase delay for the first bit of a channel and the phase of the reset signal (5). The Q output (23) of the RS flip-flop 39 becomes to H level at the same time as the signal (22), and then, the AND circuit 40 opens. The clock (7) which passes the AND circuit 40 is counted by the counter 41 up to 7. The Q output of the counter 41 becomes to L level after counting, and the change point from H level to L level is applied to the reset input of the RS flip-flop 39, and the signal (23) returns to L level. Then, the AND circuit 40 is closed, and the clock pulse (42) corresponding to the 8'th bit of the monostable multivibrator 42 is obtained. The OR circuit 45 combines the signal (24) and seven clock pulses, and the clock (9) for $B_1$ channel and $B_2$ channel is obtained. The clock phase for the last bit of the channel is determined by the clock pulse phase provided by the monostable multivibrator 42.

APPLICATION TO INDUSTRIES

As described above in detail, according to the present polyphase phase lock oscillator used in a bus coupling system, a master station (DSU) generates a gate signal for selection a plurality of channels in a received signal through frame synchronization, and a clock for each channel is regenerated by using a reception signal which is separated for each channel by the gate signal, irrespective of presence or non-presence of a guard bit. A final desired sampling clock is obtained by a combining clock for each channel.

As an effect of the present invention, the length between a master station and a slave station may be increased, and a transmission error rate is decreased because of the complete coincidence of a regenerated clock phase with a reception signal.

Accordingly, the present invention is advantageous when it is used in high speed digital Information Network System (INS).

We claim:

1. A polyphase phase lock oscillator for reception of a time division multiplex signal which has a plurality of channels with phase difference comprising:
   detecting means for detecting a first bit of a reception frame which includes said plurality of channels
   said first bit being detected by detecting a violation pattern of a reception signal using a sampling clock pulse which is higher than a clock pulse of a channel of said reception signal;
   gate signal means for providing gate signals for each one of said channels said gate signals being individually based upon timing of said first bit from said detection means so that a gate circuit, controlled by each said gate signal, passes a channel signal;
   regeneration means for regenerating a clock of a related one of said plurality of channels from a separated channel signal which is obtained by a related one of said gate signals from said gate signal means; and
   output means for output of the regenerated clock obtained by said regeneration means, said regenerated clock being synchronized with said reception frame with said plurality of channels.

2. A polyphase phase lock oscillator according to claim 1, wherein a means is provided for delaying clock phase, which samples a first bit of a channel, and for leading clock phase which samples a last bit of a channel, of said regenerated clock.

3. A polyphase phase lock oscillator according to claim 1, wherein a means if provided for newly providing another common clock which is a combination of clocks of all the channels.

4. A polyphase phase lock oscillator according to claim 1, further comprising means for initiating said regeneration means at a beginning of a related each one of said channels.

* * * * *